June 3, 1969  J. G. STIPANOVIC  3,447,647
HYDRAULIC-PNEUMATIC TREAD BRAKE UNIT FOR RAILWAY CAR TRUCKS
Filed Sept. 5, 1967
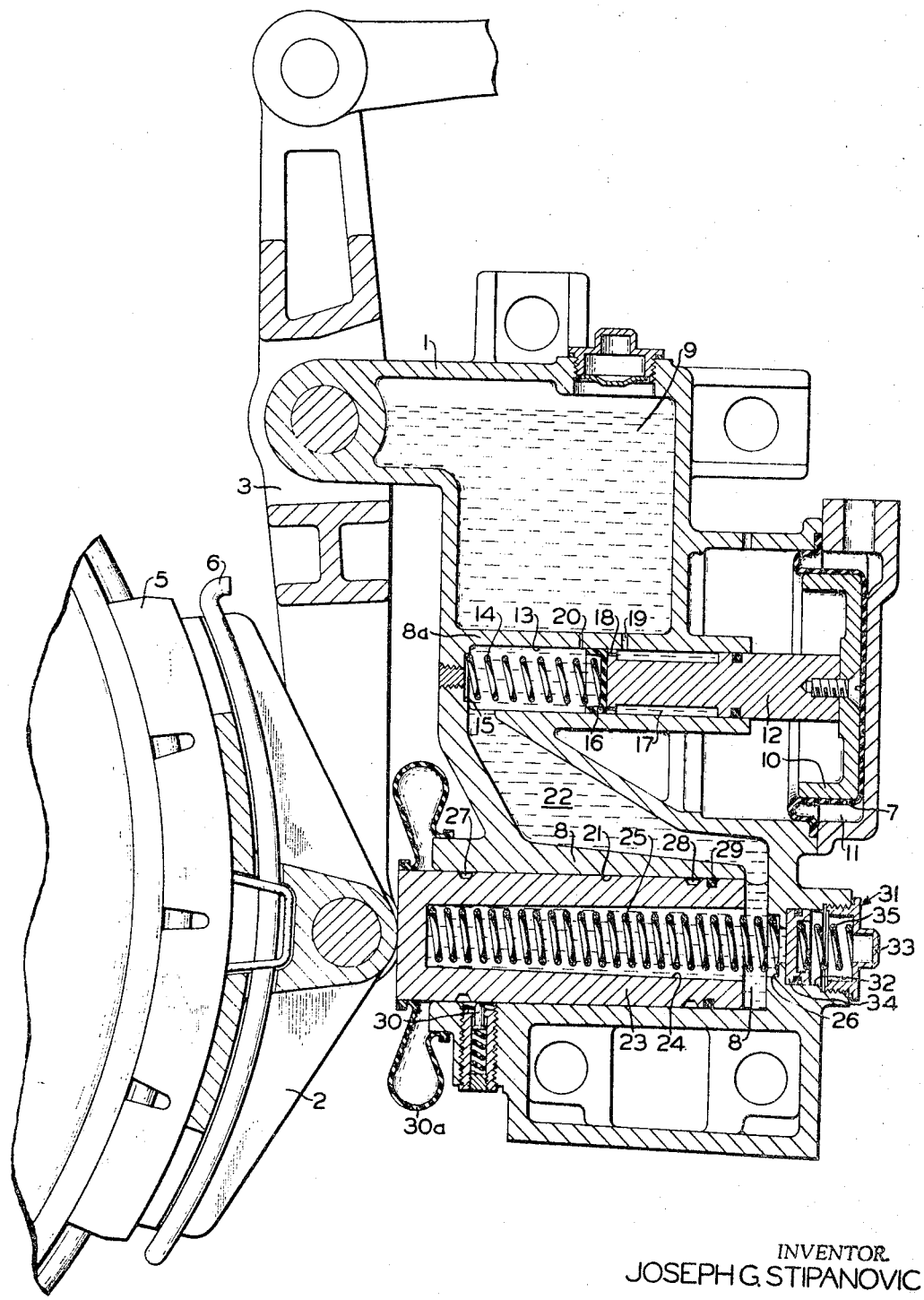
INVENTOR.
JOSEPH G. STIPANOVIC
BY Donald P. Rooney
AGENT

United States Patent Office 3,447,647
Patented June 3, 1969

3,447,647
HYDRAULIC-PNEUMATIC TREAD BRAKE UNIT FOR RAILWAY CAR TRUCKS
Joseph G. Stipanovic, McKeesport, Pa., assignor to Westinghouse Air Brake Company, Wilmerding, Pa., a corporation of Pennsylvania
Filed Sept. 5, 1967, Ser. No. 665,488
Int. Cl. B60t *11/10, 13/04;* F16d *51/00*
U.S. Cl. 188—153                               3 Claims

ABSTRACT OF THE DISCLOSURE

A pneumatically controlled hydraulically actuated tread brake unit of the "snow brake" type to be utilized on each wheel of a railroad car. The "snow brake" type tread brake unit comprises a brake shoe that remains in light-pressure contact with the tread of the wheel at all times including the time the car is in motion with the brakes released, to produce heat on the tread of the wheel and the brake shoe to keep snow from packing or ice from forming on the tread of the wheel. Compensation for wear of the brake shoe is automatically provided hydraulically by an automatic slack adjuster. Also, compensation for out-of-roundness of the car wheel is constantly provided.

---

Tread brake units for individual car wheels of railway and rapid transit cars of the passenger type utilized in subway service are coming increasingly into service. These tread brake units are inherently large in size, employing a brake actuating lever through which pneumatic power cylinder force is mechanically amplified in applying the brake shoe to the tread of the car wheel. Moreover, these tread brake units commonly have embodied therein automatic slack adjusters of a mechanical type that maintain a proper normal clearance with the tread of the wheel.

U.S. Patent 2,926,758 discloses a hydraulically actuated pneumatically controlled tread brake unit incorporating an automatic slack adjuster. However, it does not disclose a tread brake unit of the "snow brake" type wherein the brake shoe is maintained in light-pressure contact with the tread of the wheel to build up heat of friction which will keep snow and ice from accumulating on the tread of the wheel.

It is, therefore, the object of the present invention to provide a relatively small, light-weight tread brake unit of the "snow brake" type which provides necessary force amplification through application of pneumatic pressure to a closed hydraulic system which includes means for supplementing the hydraulic fluid in the system to compensate for wear of the brake shoes and/or wheel as well as an accumulator to enable uniform braking notwithstanding out-of-roundness of the wheel.

According to the invention, a novel pneumatically controlled hydraulically actuated tread brake unit is provided comprising a casing on which a brake head and shoe are movably supported for actuation by a hydraulic pressure actuated piston operable in a bore in said casing. A hydraulic pressure system including a sump is actuated by a pneumatic-pressure actuated diaphragm and spring returned plunger which is reciprocated in a bore within the casing by supply and release of compressed air, the plunger opening and closing communication between the sump and the bore in which the hydraulic plunger operates. The plunger in turn transmits a force to the hydraulic piston, which is operably connected to the brake head and is spring-biased to hold the brake shoe in light-pressure contact with the tread of the wheel.

An accumulator located between the piston and the plunger functions to regulate the hydraulic fluid pressure when the brake shoe is moved away from and toward the axle of the wheel due to out-of-roundness of the wheel. The out-of-round wheel causes the hydraulic piston to exert pressure on hydraulic fluid trapped in the system by the plunger closing off the return ports to the sump. The trapped fluid is displaced into the accumulator permitting the brake head to reciprocate as the eccentric wheel rotates preventing cyclical variations of braking pressure with each revolution of the wheel.

In the drawing, the single figure is a side elevational view, partially in section, of a tread brake unit embodying the invention.

As shown in the drawing, a hydraulic-pneumatic unit, one of which is provided for each wheel of a car truck is suitably secured, as by bolts and nuts, to the frame of the car truck in appropriate relation to a car wheel.

As further shown in the drawings, the brake unit comprises a sectionalized casing 1 and a brake head 2 pivotally suspended at the lower end of a combined brake lever and hanger 3 pivotally mounted intermediate its ends on a projecting boss of said casing. The brake head carries a brake shoe 5, secured to the brake head by a conventional key 6, for frictionally engaging the tread of the wheel as hereafter more fully described.

Within the casing 1 are a pneumatic-pressure actuated diaphragm 7 and a hydraulic system including two hydraulic cylinders 8 and 8a and a hydraulic fluid sump 9.

The diaphragm is fitted to a follower 10 within a chamber 11 surrounding the diaphragm follower and diaphragm. The diaphragm follower has threadably fitted thereto a plunger 12 which reciprocates within a bore 13 of cylinder 8a, the follower 10 and plunger being biased normally by a spring 14 in the right-hand direction to a position in which the diaphragm engages the wall of the chamber 11.

The plunger 12 has an annular peripheral groove 17 which forms a flange at the end of the plunger. Within this flange are ports 18 which extend longitudinally so as to connect the groove 17 with the end face of the plunger on which a packing cup 16 seats so that fluid can flow from the annular groove to the end of the plunger. An orifice 19 is always open to communicate fluid from sump 9 to the groove 17. Abutting the plunger 12 at its free end and held in that position by spring 14 is packing cup 16 which is used to close off ports 18 and stop the flow of hydraulic fluid toward the peripheral groove 17.

Adjacent to and in juxtaposition with the orifice 19 is a small port 20 which also communicates fluid to and from the sump 9 and bore 13; however, this port 20 is lapped off by plunger 12 and communication between the sump and the bore 13 is thus sealed and fluid is not permitted to flow by the packing cup 16 as it moves past the mouth of the port 20 within the bore 13.

Hydraulic cylinder 8 is located within the casing 1 and communicates with cylinder 8a via a communicating passageway 22. Within the hydraulic cylinder 8 is a piston 23 having a longitudinal bore 24 nearly the length of the piston. Interposed within this bore, between the piston 23 and an annular shoulder 26 at the base of the hydraulic cylinder, is a compression spring 25 which constantly exerts force on the piston in a direction tending to force the piston out of the hydraulic cylinder. The function of the spring 25 is to hold the brake shoe in light pressure contact with the tread of the wheel so that heat is generated on both friction surfaces to prevent the accumulation of ice and snow on the tread of the wheel.

The piston 23 has three circumferential grooves 27, 28 and 29 around the periphery thereof. One groove 29 is close to the inner end of the piston and contains a conventional O-ring sealing means. Another groove is adjacent said O-ring groove and the third groove is at the outer end of the piston, which is the end that extends to the outside of the hydraulic cylinder and the outside of the casing. Close to the mouth of the hydraulic cylinder is a spring loaded detent 30 which is adapted to engage within the latter two circumferential grooves in the piston. Its purpose is to hold the piston at bottom dead center when the spring within the piston is fully compressed and also to engage the other circumferential groove 28 to prevent the piston from being expelled from the hydraulic cylinder by the force of the spring within the piston when the brake head is removed. At the piston's outer or closed end is an annular resilient dust cover or boot 30a which has one end fixed to the casing and the other to the piston to prevent dust and moisture from entering into the hydraulic cylinder between the outer wall of the piston and the inner wall of the cylinder.

Any out-of-roundness of the wheel that would cause cyclical variations of braking pressure on every revolution of the wheel is automatically eliminated by an accumulator 31. The accumulator 31 is located at the base of the cylindrical bore 21 and comprises a bore 32 open at its inner end to bore 21 and threaded at its outer end and having an externally accessible threaded plug 33 closing said outer end. Within the bore 32 is a piston 34 which is biased into engagement with the shoulder 26 by a compression spring 35. A convetnional O-ring seal, mounted in a circumferential groove in the periphery of the piston, provides proper sealing between the piston 34 and the wall of the bore 32. The spring 35 yields to permit movement of piston 34 into bore 32 to enable displacement of hydraulic fluid into bore 32 to prevent increases in hydraulic pressure within the hydraulic system, such as when the back pressure on piston 23 increases due to out-of-roundness of the vehicle wheel.

As shown in the drawing, for a brake release condition, the brake shoe is in light contact with the tread of the car wheel which is a result of the hydraulic piston spring 25 exerting pressure on the piston 23. If a brake application is desired, air under pressure is supplied, under the control of suitable means not shown, to the chamber 11 exerting a force on the diaphragm 7 and follower 10 causing plunger 12 to be moved into the bore 13 against the force of spring 14. Packing cup 16 seals off port 20 preventing hydraulic fluid trapped in the passageway from returning into the sump; therefore, the hydraulic fluid, being incompressible, is moved through passageway 22 into the hydraulic cylinder 8 transmitting a force amplification to the larger hydraulic piston 23 which abuts the heel of the brake shoe 2 and exerts a correspondingly greater force on the brake shoe in relation to the amount of pneumatic pressure on the diaphragm.

When the brake application is to be released, pneumatic pressure in the diaphragm chamber 11 is reduced or completely released and the diaphragm and diaphragm plunger 12 are returned by the spring 14. As this occurs the force is released from the hydraulic piston 23; however, the piston will remain and the brake head will be held in light-pressure contact with the tread of the wheel and the piston will be held against the heel of the brake head by the slack adjusting spring 25. As the plunger 12 returns with the diaphragm and a partial vacuum is created within the bore 13 and since the packing cup has sealed off port 20, fluid is restricted from flowing. The sump orifice 19 communicates fluid from the sump to the groove 17 in the plunger 12 which in turn is sucked by the suction created by the returning plunger in the passageway through the longitudinal bores 18 past the periphery of the packing cup 16 and into the bore 13 replenishing the necessary volume of fluid to compensate for any outward movement of piston 23 due to attrition or wear of the barke shoe.

If the wheel is out-of-round, the brake shoe can conform during a brake application to its eccentric motion since the hydraulic fluid in the system, unable to return to the sump, can overcome the force of accumulator spring 35 and pulsate piston 34 within bore 32 on each revolution of the eccentric wheel.

With the brake shoe in light pressure contact with the tread of the wheel during a brake released condition, the tread brake unit can be operated for maintenance purposes or replacement of a brake shoe. The hydraulic piston spring pressure can be overcome by forcing the brake head against the outer end of the piston until the piston is locked in an inward position by detent 30 engaging in groove 27, thus permitting the removal of brake shoe and its replacement. The detent can be released after work is completed by initiating a brake application which will force the rounded detent out of the circumferential groove 27 and restore the hydraulic piston to its normal light-pressure applying or "snow brake" condition. During the repair or replacement operation when the piston is held by the detent and the hydraulic fluid evacuated from the hydraulic cylinder is forced back through the passageway 22 into bore 13 and through port 20 and back into the sump.

Having now described the invention, what I claim as new and desire to secure by Letters Patent is:

1. A pneumatically controlled hydraulically actuated brake unit comprising:
   (a) a casing,
   (b) brake means movably supported on said casing for frictionally applying a braking force to an element to be braked,
   (c) said casing having formed therein
      (i) a sump reservoir holding a supply of hydraulic fluid,
      (ii) a first cylinder to which hydraulic fluid from said sump is communicated,
      (iii) a second cylinder to which hydraulic fluid is communicated from said first cylinder,
   (d) pneumatic-pressure-actuated plunger means operable in said first cylinder to apply pressure to the hydraulic fluid in said first cylinder,
   (e) piston means, operable in said second cylinder, comprised of a tubular member, the outer end of which is closed and separately abuts said brake means and the inner end of which is open to the hydraulic fluid pressure in said second cylinder, and
   (f) helical spring means contained in said tubular member and compressively interposed between the closed end of the tubular member and a wall of said casing to maintain said brake means applied to a predetermined low degree notwithstanding relief of the hydraulic fluid pressure in said second cylinder, said piston means being subject to the hydraulic pressure established in said second cylinder by the pneumatic pressure applied to said plunger means to effect a brake application to a desired degree in addition to said predetermined low degree of pressure application.

2. The pneumatically controlled hydraulically actuated brake unit as claimed in claim 1, further characterized by:
   (a) port means in said first cylinder via which hydraulic fluid is communicated from said sump reservoir to said first cylinder,
   (b) said plunger means controlling said port means so as to close off flow from the sump reservoir to said first cylinder upon application of pneumatic pressure thereto and permitting influx of hydraulic fluid into said first cylinder upon relief of pneumatic pressure from said plunger means to maintain said first cylinder and second cylinder filled with hydraulic fluid notwithstanding wear of the said brake means.

3. A pneumatically controlled hydraulically actuated brake unit as claimed in claim 1, further characterized by an accumulator device, said device comprising a piston operable in a bore in said casing which communicates with said second cylinder and being subject on one side to the hydraulic fluid pressure in said second cylinder, and spring means opposingly exerting a resilient force on the opposite side of said piston in opposition to said hydraulic fluid pressure.

References Cited

UNITED STATES PATENTS

| | | | |
|---|---|---|---|
| 1,805,808 | 5/1931 | Crum | 188—151 |
| 1,978,862 | 10/1934 | Gregg | 92—30 |
| 2,081,239 | 5/1937 | Klopfenstein | 92—30 X |
| 2,514,588 | 7/1950 | Nystrom et al. | 188—153 |
| 2,923,132 | 2/1960 | Oswalt. | |
| 2,926,758 | 3/1960 | Frola | 188—153 |
| 2,952,128 | 9/1960 | Highland | 60—54.6 |
| 3,280,945 | 10/1966 | Spalding. | |

GEORGE E. A. HALVOSA, *Primary Examiner.*

U.S. Cl. X.R.

188—74, 166